United States Patent
Futamura (10) Patent No.: US 6,616,561 B2
(45) Date of Patent: Sep. 9, 2003

(54) HYDRAULIC CONTROL APPARATUS AND AN AUTOMATIC TRANSMISSION CONTROL SYSTEM

(75) Inventor: Suguru Futamura, Toyokawa (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/102,936

(22) Filed: Mar. 22, 2002

(65) Prior Publication Data

US 2002/0137587 A1 Sep. 26, 2002

(30) Foreign Application Priority Data

Mar. 23, 2001 (JP) .......................................... 2001-085486

(51) Int. Cl.⁷ .............................................. F16H 31/00
(52) U.S. Cl. ....................................... 475/123; 475/116
(58) Field of Search ................................ 475/123, 116; 477/131, 138

(56) References Cited

FOREIGN PATENT DOCUMENTS

JP          2001-280468 A       10/2001

*Primary Examiner*—Dirk Wright
(74) *Attorney, Agent, or Firm*—Burns, Doane, Swecker & Mathis, LLP (57) ABSTRACT

A hydraulic control apparatus includes a linear solenoid valve for outputting modulated pressure in response to electric current applied to the linear solenoid valve, a plurality of control valves outputting control pressure in response to the modulated pressure introduced from the linear solenoid valve, a shift valve for switching between the control valves to which is to be introduced the modulated pressure in response to hydraulic pressure supplied to the shift valve, and an ON-OFF solenoid valve for switching the supply of the hydraulic pressure to the shift valve in response to electric current applied to the ON-OFF solenoid valve.

9 Claims, 9 Drawing Sheets

|     | C1 | C2 | C3 | B1  | B2 |
|-----|----|----|----|-----|----|
| R   |    |    | ○  |     | ○  |
| N   |    |    |    | (○) | ○  |
| 1st | ○  |    |    |     | ○  |
| 2nd | ○  |    |    | ○   |    |
| 3rd | ○  |    | ○  |     |    |
| 4tH | ○  | ○  |    |     |    |
| 5th |    | ○  | ○  |     |    |
| 6th |    | ○  |    | ○   |    |

| Shift pattern | ON-OFF S/V | | | D range | | | | | | N range | | | | | | R range | | | | | |
|---|---|---|---|---|---|---|---|---|---|---|---|---|---|---|---|---|---|---|---|---|---|
| | 35 | 36 | 37 | C1 | C2 | C3 | B1 | B2 | LU | C1 | C2 | C3 | B1 | B2 | LU | C1 | C2 | C3 | B1 | B2 | LU |
| -1 | O | × | O | PL | | | | 2 | | | | | | 2 | | | | PL | | 4 | |
| 0 | O | O | O | 1 | | | | 2 | | | | | | 2 | | | | 3 | | 4 | |
| 1 | × | O | O | 3 | | | 1 | 2 | | | | | | 2 | | | | | | 4 | |
| 2 | × | × | O | PL | | | 1 | 2 | | | | | | 2 | | | | PL | | 4 | |
| 3 | × | × | × | PL | | 2 | 1 | | 4 | | | 2 | | | 4 | | | 2 | | PL | 4 |
| 4 | O | × | × | PL | 1 | 2 | | | 4 | | | 2 | | | 4 | | | 2 | | PL | 4 |
| 5 | O | O | × | 1 | PL | 2 | | | 4 | | | 2 | | | 4 | | | 2 | | PL | 4 |
| 6 | × | O | × | | PL | 2 | 1 | | 4 | | | 2 | | | 4 | | | 2 | | PL | 4 |

| REMARKS | | |
|---|---|---|
| | O | Electrically excited |
| | × | Electrically de-excited |
| | 1 | The friction engagement elements controlled by the first linear SOL valve 22 for supplying the control pressure from the first control valve 25 |
| | 2 | The friction engagement elements controlled by the second linear SOL valve 23 for supplying the control pressure from the second control valve 26 |
| | 3 | The friction engagement elements controlled by the third linear SOL valve 24 for supplying the control pressure from the start control valve 27 |
| | 4 | The friction engagement element (the lock up clutch LU) controlled by the third linear SOL valve 24 for supplying the control pressure from the LU control valve 28 |

HYDRAULIC CONTROL APPARATUS AND AN AUTOMATIC TRANSMISSION CONTROL SYSTEM

This application is based on and claims priority under 35 U.S.C. §119 with respect to a Japanese Patent Application 2001-085486 filed on Mar. 23, 2001, the entire content of which is incorporated herein by reference.

FIELD OF THE INVENTION

This invention generally relates to a hydraulic control apparatus. More particularly, the present invention pertains to an automatic transmission provided with a hydraulic control apparatus for controlling operation of a controlled object in response to a control pressure outputted from a plurality of control valves.

BACKGROUND OF THE INVENTION

A known hydraulic control apparatus for an automatic transmission including a plurality of controlled objects is provided with a linear solenoid valve and a control valve for each controlled object for controlling respective operations of the controlled objects. The linear solenoid valve generates modulated pressure corresponding to electric current applied to the linear solenoid valve and outputs the modulated pressure to the corresponding control valve. The control valve generates control pressure corresponding to the modulated pressure discharged from the linear solenoid valve and outputs the control pressure to the corresponding controlled object. The operation of each controlled object is controlled in response to the control pressure supplied from the corresponding control valve.

Known hydraulic control apparatus with the above described structure are generally provided with an individual linear solenoid valve for each control valve. However, linear solenoid valves may be more costly as compared to other valves including a shift valve. Further, the circuit structure for electrically exciting the linear solenoid valve may be complicated. These drawbacks may thus lead to an increase in the overall manufacturing cost.

Figure 9:
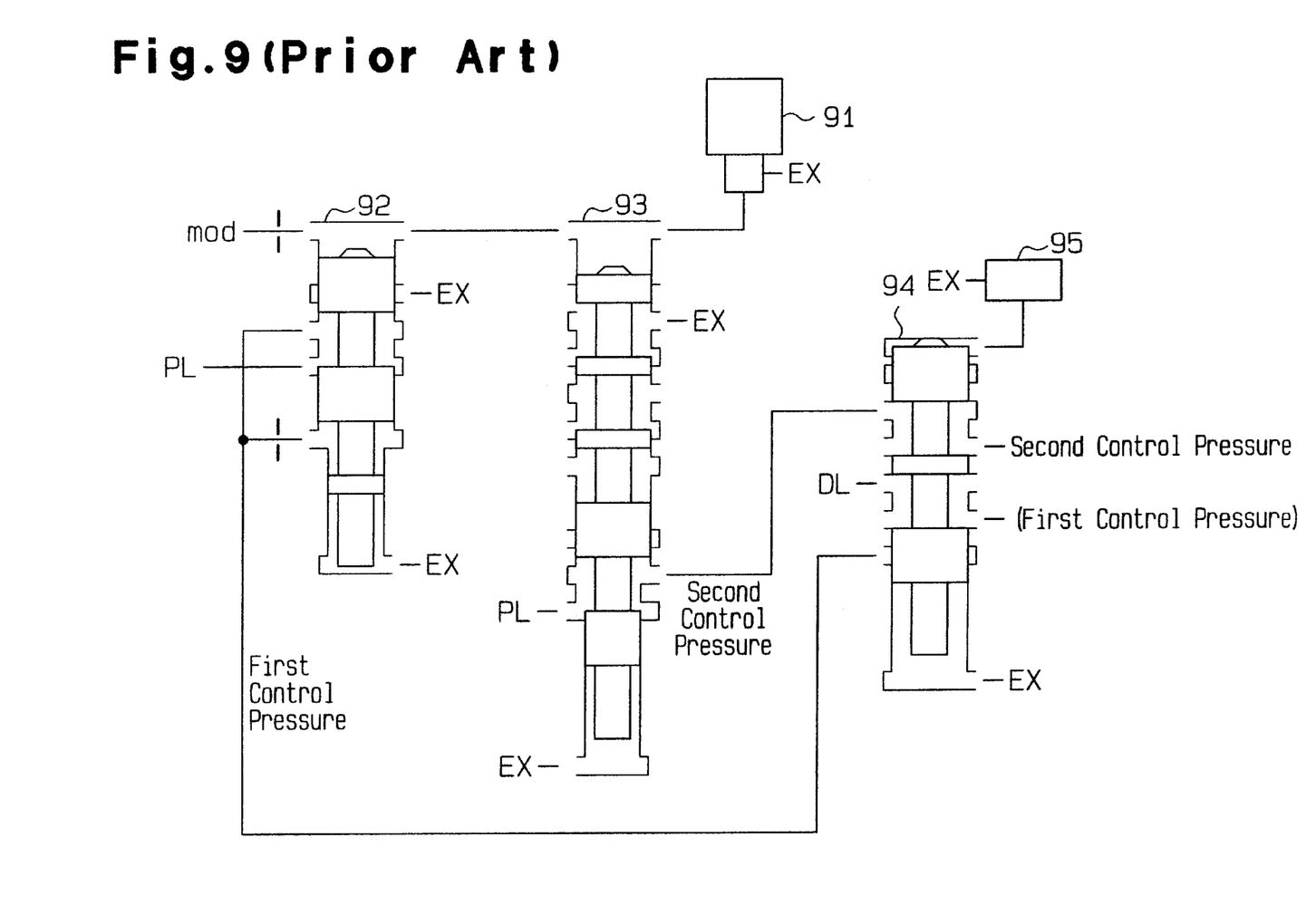
FIG. 9 is a schematic illustration of a known hydraulic control unit.

To overcome the above-described drawbacks, somewhat recent developments have led to a hydraulic control apparatus in which plural control valves with no need to output the control pressure substantially at the same time can share the same linear solenoid valve. For example, a hydraulic control apparatus illustrated in FIG. 9 is provided with a linear solenoid valve 91, a first control valve 92, a second control valve 93, a shift valve 94, and an ON-OFF solenoid valve 95. The first and second control valves 92, 93 are respectively arranged in series relative to the linear solenoid valve 91 and are supplied with modulated pressure mod discharged from the linear solenoid valve 91. The first control valve 92 outputs a first control pressure in response to the modulated pressure mod introduced to the first control valve 92 from the linear solenoid valve 91 and the second control valve 93 outputs a second control pressure in response to the modulated pressure mod introduced to the second control valve 93 from the linear solenoid valve 91. The first and second control pressures are supplied to any one of controlled objects selected via the shift valve 94.

The shift valve 94 is maintained under a first operating condition in which a valve element of the shift valve 94 is biased downward in FIG. 9 when hydraulic pressure is supplied to the shift valve 94 from the ON-OFF solenoid valve 95 corresponding to electric current applied thereto. In this case, the control pressure (a first control pressure) discharged from the first control valve 92 can be outputted to the corresponding controlled object via the shift valve 94. On the other hand, the shift valve 94 is maintained under a second operating condition in which the valve element of the shift valve 94 is returned to the upper position in FIG. 9 when hydraulic pressure is not supplied to the shift valve 94 from the ON-OFF solenoid valve 95. In this case, the control pressure (a second control pressure) from the second control valve 93 can be outputted to the corresponding controlled object via the shift valve 94.

As described above, the modulated pressure mod is introduced to the first and second control valves 92, 93 from the linear solenoid valve 91, and the control pressure outputted from each of the control valves 92, 93 corresponding to the modulated pressure mod is selectively outputted to any one of the controlled objects via the shift valve 94.

However, the hydraulic control apparatus for the automatic transmission having the above construction may suffer from the following drawbacks. The modulated pressure mod needs to be outputted to the first and second control valves 92, 93 only from the linear solenoid valve 91 substantially at one time. Therefore, the linear solenoid valve 91 may be overloaded which may lead to a deterioration in response of the controlled objects.

Accordingly, the above disclosed hydraulic control apparatus for the automatic transmission is susceptible of certain improvements with respect to improving the response of the controlled objects to be controlled in response to the control pressure outputted from the plural control valves.

SUMMARY OF THE INVENTION

A hydraulic control apparatus includes a linear solenoid valve for outputting modulated pressure in response to electric current applied to the linear solenoid valve, a plurality of control valves outputting control pressure in response to the modulated pressure introduced from the linear solenoid valve, a shift valve for switching between the control valves to which is to be introduced the modulated pressure in response to hydraulic pressure supplied to the shift valve, and an ON-OFF solenoid valve for switching the supply of the hydraulic pressure to the shift valve in response to electric current applied to the ON-OFF solenoid valve.

The hydraulic control apparatus can improve the response of the controlled objects to be operated in response to the control pressure outputted from the plural control valves.

The linear solenoid valve is preferably arranged at a downstream side of the shift valve. Thus, if air is placed into the shift valve, the air can be discharged from the linear solenoid valve. Accordingly, the hydraulic control apparatus can effectively inhibit or prevent slow response of the controlled objects and/or generation of vibration while also facilitating or ensuring a stable performance.

According to another aspect of the present invention, an automatic transmission with the hydraulic control apparatus is provided with plural friction engaging elements for changing a shift stage through combinations of engaged and disengaged conditions of the friction engaging elements based on the control pressure supplied to the friction engaging elements. The shift valve further switches the supply of the control pressure supplied to the plural friction engaging elements. Therefore, other components are not additionally required for the automatic transmission with the hydraulic control apparatus.

The plural control valves include a pair of control valves outputting the control pressure to each friction engaging element associated with any one of the shift stages at a higher speed and to each friction engaging elements associated with any one of the shift stages at a lower speed. The shift valve for switching the supply of the control pressure supplied to the plural friction engaging elements is switched over upon shifting of the shift stage between the higher speed stage and the lower speed stage. Therefore, the plural control valves and the shift valve are effectively operated in relation to one another to perform an appropriate shifting control.

According to another aspect, an automatic transmission control system includes a linear solenoid valve for outputting modulated pressure in response to electric current applied to the linear solenoid valve, a start control valve and a lock-up control valve which output control pressure in response to the modulated pressure introduced from the linear solenoid valve, plural friction engaging elements to be engaged and disengaged in different combinations based on the control pressure to change a shift stage, a shift valve operable in response to hydraulic pressure supplied to the shift valve for switching between introducing the modulated pressure to the start control valve and introducing the modulated pressure to the lock-up control valve to switch the friction engaging elements to which the control pressure is supplied, and an ON-OFF solenoid valve switching supply of the hydraulic pressure to the shift valve in response to electric current applied to the ON-OFF solenoid valve.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
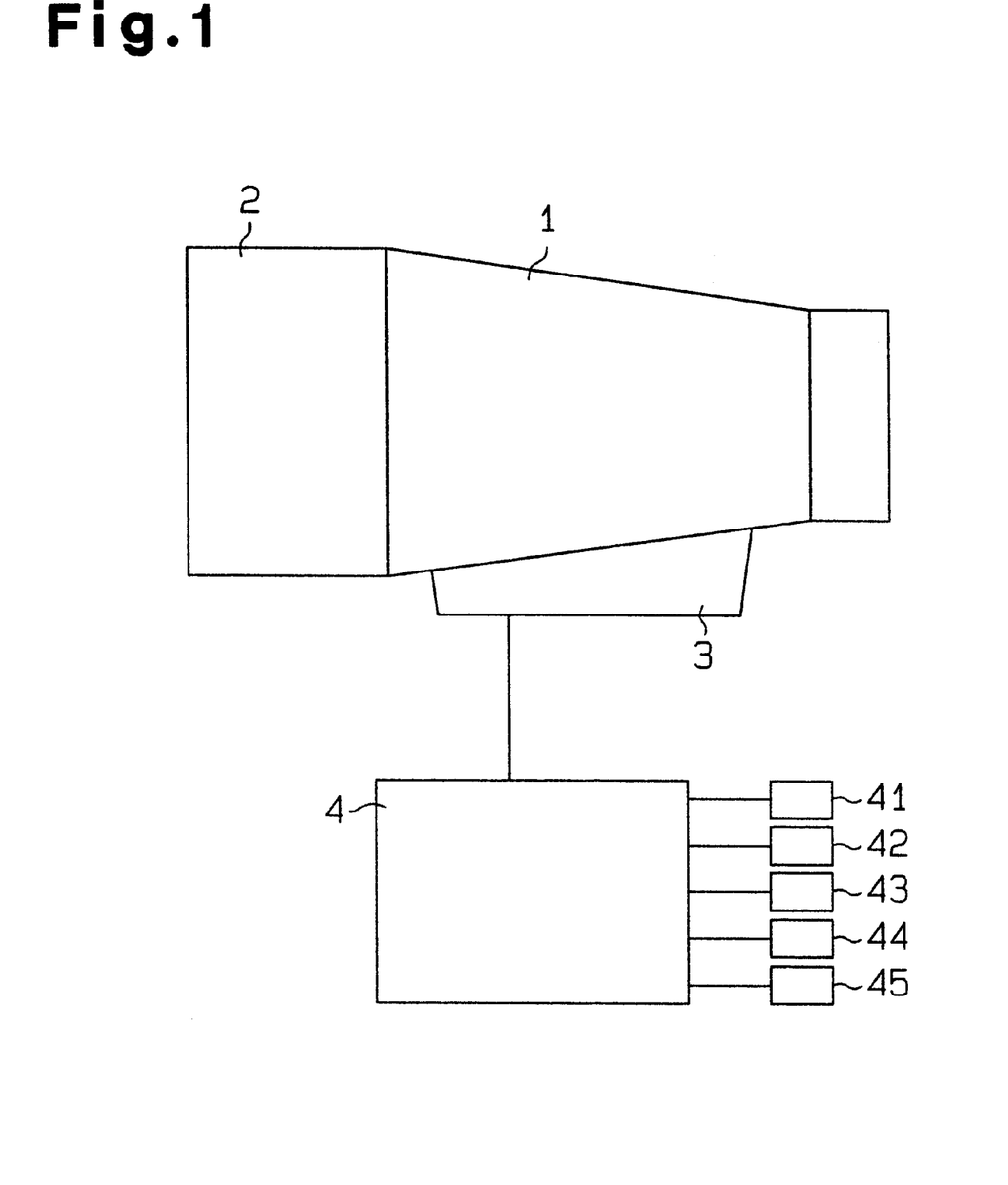
FIG. 1 is a block diagram schematically illustrating the overall control system for an automatic transmission according to an embodiment of the present invention.

Referring to FIG. 1, an automatic transmission control system according to one embodiment is provided with an automatic transmission 1 connected to an output shaft of an engine 2, a hydraulic control unit 3 and an electronic control unit 4. The hydraulic control unit 3 controls the oil pressure to be supplied to hydraulically driven friction engaging elements (described later) included in the automatic transmission 1. The electronic control unit 4 controls the operations of the solenoid valves (described later) included in the hydraulic control unit 3.

Figure 2:
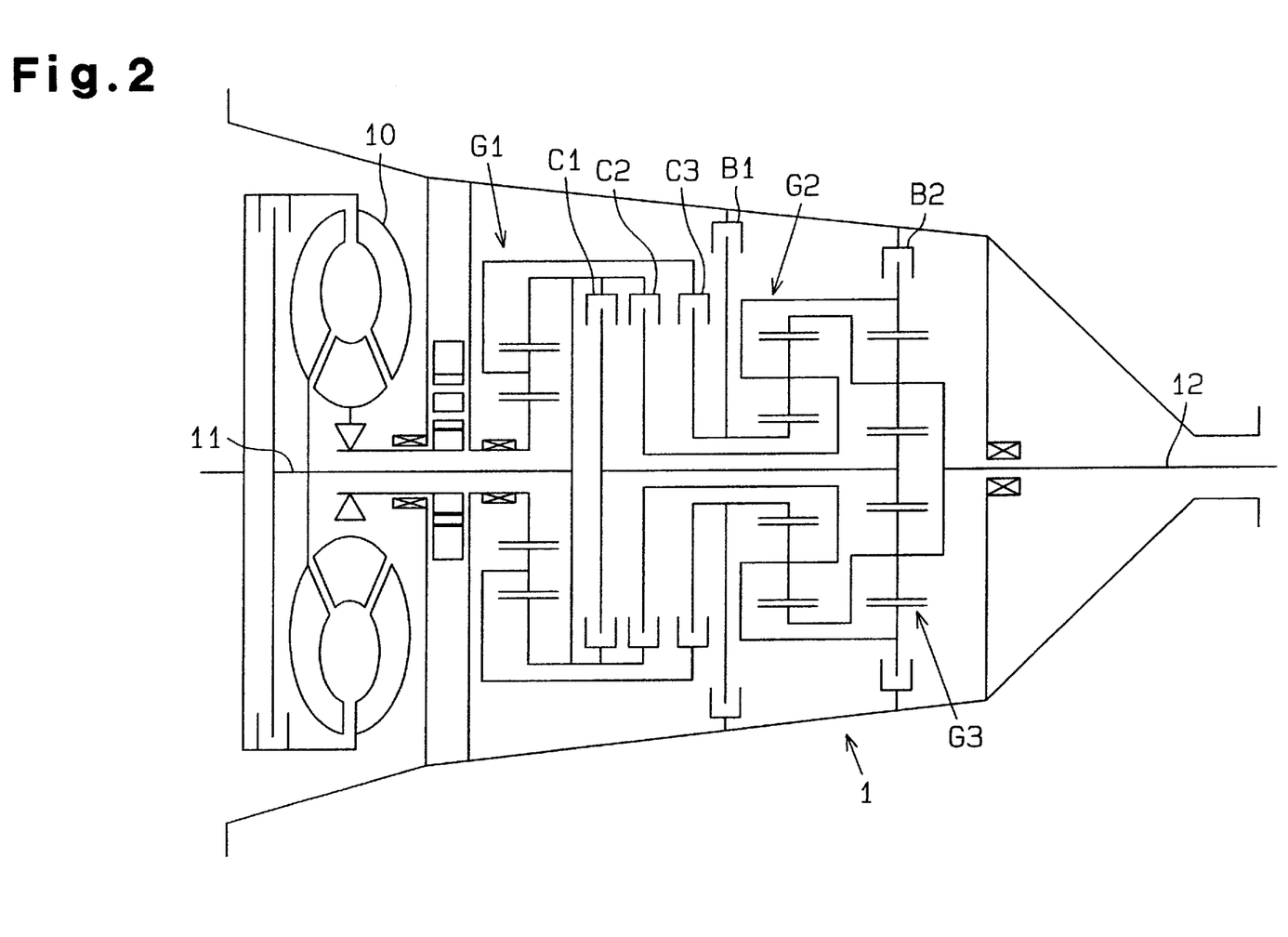
FIG. 2 is a schematic illustration of the automatic transmission in which the hydraulic control apparatus is used.

Referring to FIG. 2, the automatic transmission 1 is provided with an input shaft 11 serving as an output shaft of a torque converter 10, an output shaft 12 operatively connected to an axle shaft via a differential unit, and a gear train including a first planetary gear G1 with a single pinion gear, a second planetary gear G2 with a single pinion gear, and a third planetary gear G3 with a single pinion gear. The first planetary gear G1 includes a ring gear connected to the input shaft 11. The automatic transmission 1 is further provided with plural friction engaging elements including a first friction clutch C1, a second friction clutch C2, a third friction clutch C3, a first friction brake B1, and a second friction brake B2. The hydraulic control unit 3 and the electronic control unit 4 switch the supply of the oil pressure supplied to the respective friction engaging elements so that each friction engaging element is selectively switched between an engaged condition and a disengaged condition. Therefore, the shift stages and the shift patterns of the automatic transmission 1 are selectively switched. Each of the five friction engaging elements is switched to the engaged condition when the oil pressure at a high pressure level is supplied thereto by the hydraulic control unit 3 and is switched to the disengaged condition when the oil pressure at a low pressure level is supplied thereto by the hydraulic control unit 3.

Figure 3:
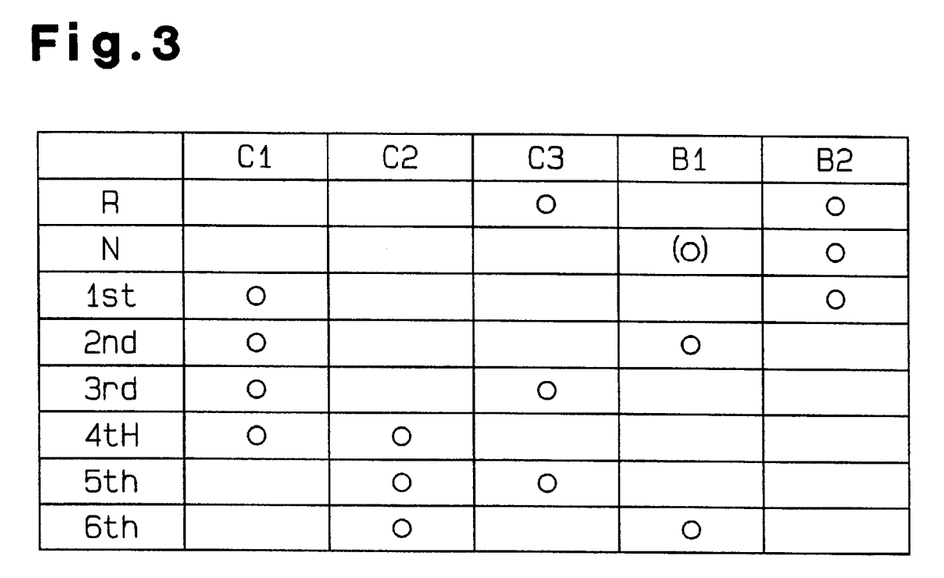
FIG. 3 is a table showing the engagement and release conditions of each of the friction engagement elements for producing various shift stages.

Referring to FIG. 3, the automatic transmission 1 is adapted to perform a single reverse shift stage, a neutral shift stage and six forward shift stages. The six forward shift stages include underdrive shift stages (from a first shift stage to a fourth shift stage) and overdrive shift stages (from a fifth shift stage to a sixth shift stage). The symbol ○ in the table of FIG. 3 indicates that the respective friction engaging element is under the engaged condition to perform a shift stage of the automatic transmission 1. The absence of the symbol ○ in the table in FIG. 3 indicates that the respective friction engaging element is under the disengaged condition.

For example, the vehicle is driven in a rearward direction by reversing the rotation of the output shaft 12 relative to the input shaft 11 only when the third friction clutch C3 and the second friction brake B2 are under the engaged condition. The reverse shift stage is hence performed in the automatic transmission 1. The rotation of the output shaft 12 is stopped only when the second friction brake B2 is under the engaged condition or only when the second friction brake B2 and the first friction brake B1 are under the engaged condition. The first shift stage is performed only when the first friction clutch C1 and the second friction brake B2 are under the engaged condition. The second shift stage is performed only when the first friction clutch C1 and the first friction brake B1 are under the engaged condition. The third shift stage is performed only when the first and third friction clutches C1, C3 are under the engaged condition. The fourth shift stage is performed only when the first and second friction clutches C1, C2 are under the engaged condition. The fifth shift stage is performed only when the second and third friction clutches C2, C3 are under the engaged condition. The sixth shift stage is performed only when the second friction clutch C2 and the first friction brake B1 are under the engaged condition.

Figure 4:
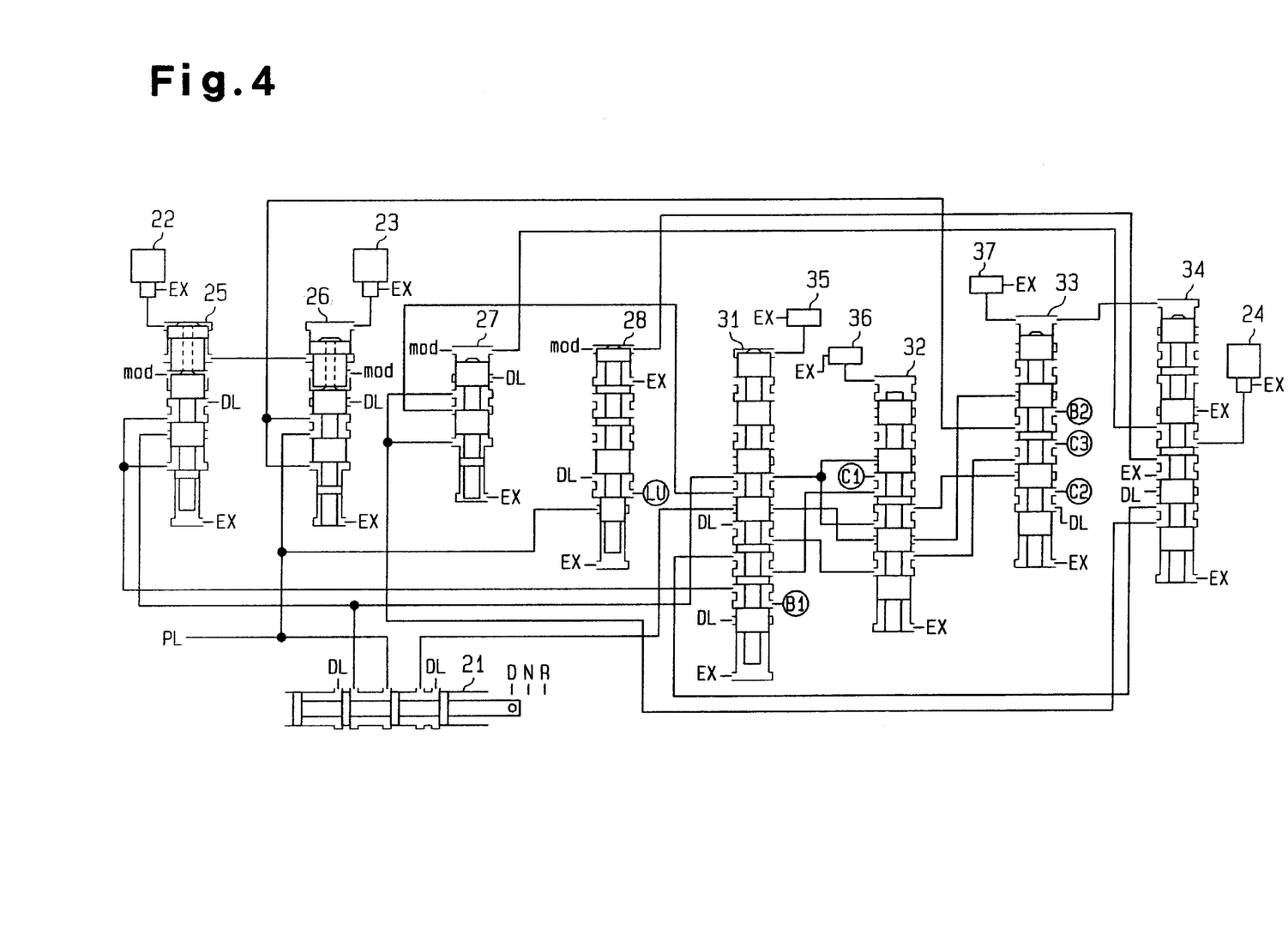
FIG. 4 is a schematic illustration of the hydraulic circuit of the hydraulic control unit of the automatic transmission during a lower speed operating condition.
Figure 5:
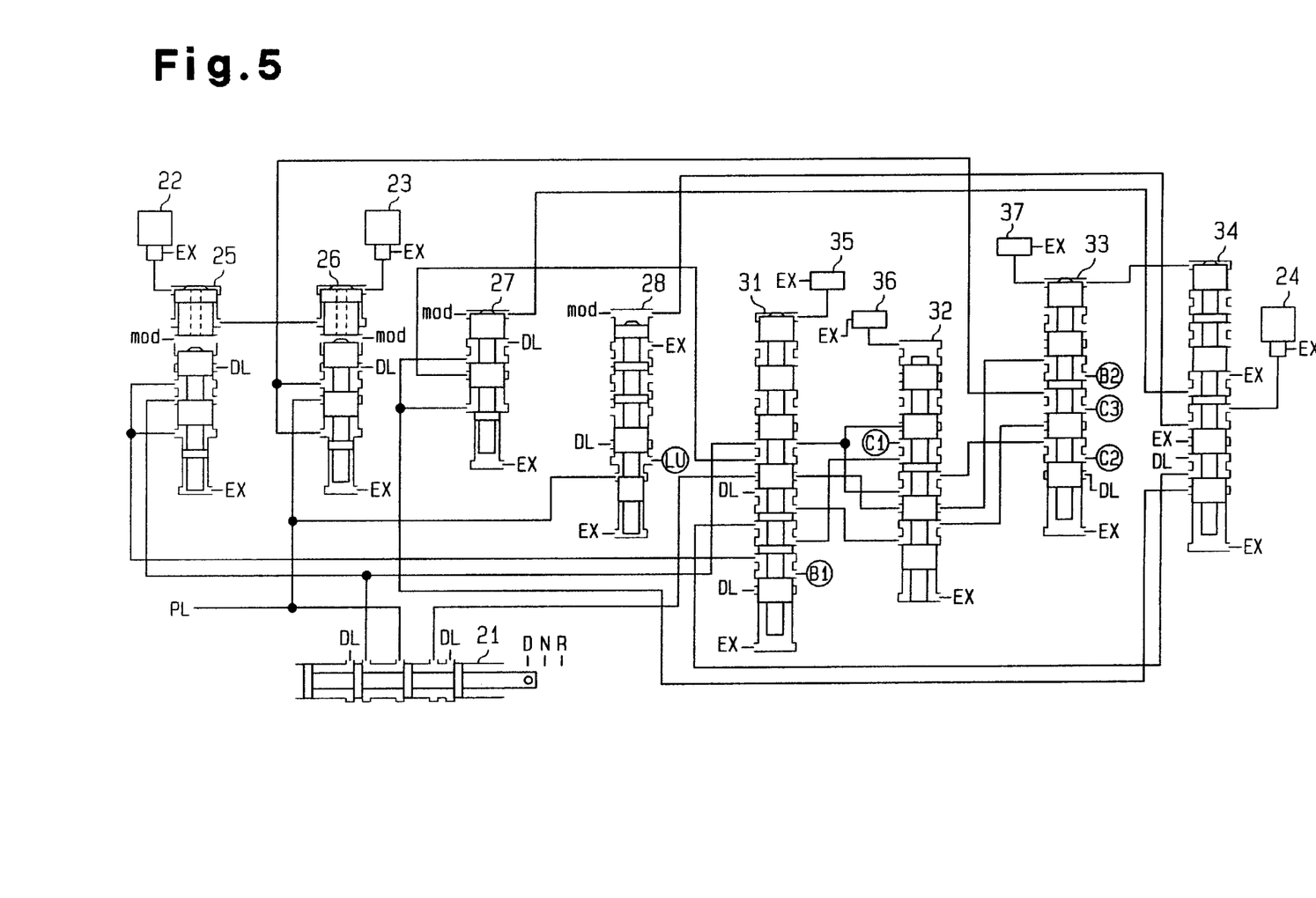
FIG. 5 is a schematic illustration of the hydraulic circuit of the hydraulic control unit of the automatic transmission during a higher speed operating condition.

Referring to the hydraulic circuit diagrams shown in FIGS. 4 and 5, and the table shown in FIG. 6, the structure and controlling condition of the hydraulic control unit 3 for engaging and disengaging each of the friction engaging elements are as follows. Referring to FIGS. 4 and 5, the hydraulic control unit 3 is supplied with a line pressure PL generated in response to a oil pressure discharged from an oil pump. The hydraulic control unit 3 is provided with a manual valve 21, a first linear solenoid valve 22, a second linear solenoid valve 23, a third linear solenoid valve 24, a first control valve 25, a second control valve 26, a start control valve 27, an LU (lock up) control valve 28, a first shift valve 31, a second shift valve 32, a third shift valve 33, a fourth shift valve 34, an ON-OFF solenoid valve 35, an ON-OFF solenoid valve 36, and an ON-OFF solenoid valve 37. The manual valve 21 is employed for switching the hydraulic circuit operatively associated with a driving range (® range, N range, and D range) selected by an operation of a shift lever. The first, second and third linear solenoid valves 22, 23, 24 respectively apply the line pressure PL for respectively outputting modulated pressure mod in response to an electric current applied to each linear solenoid valve 22, 23, 24.

The first control valve 25 introduces the modulated pressure mod outputted from the first linear solenoid valve 22 and applies the line pressure PL for generating a control pressure corresponding to the modulated pressure mod. The second control valve 26 introduces the modulated pressure mod outputted from the second linear solenoid valve 23 and applies the line pressure PL for generating a control pressure corresponding to the modulated pressure mod. The start control valve 27 and the LU control valve 28 selectively introduce the modulated pressure mod outputted from the third linear solenoid valve 24 and applies the line pressure PL for generating a control pressure corresponding to the modulated pressure mod introduced to the start control valve 27 and the LU control valve 28, respectively.

The start control valve 27 outputs the control pressure especially for starting a vehicle, for driving the vehicle in the rearward direction, or upon the first shift stage. On the other hand, the LU control valve 28 outputs the control pressure relative to a lock-up clutch LU of the torque converter 10, especially when the engine 2 is rotated at a higher speed. According to this disclosed and illustrated embodiment, the LU control valve 28 is operated for performing the third, fourth, fifth and sixth shift stages by the automatic transmission 1. As described above, the start control valve 27 and the LU control valve 28 are not operated at the same time. Therefore, the modulated pressure mod is selectively introduced from the third linear solenoid valve 24 to either the start control valve 27 or the LU control valve 28 by a switching operation of the fourth shift valve 34.

More specifically, the start control valve 27 is employed for outputting the control pressure to the controlled objects associated with each shift stage at a lower speed. On the other hand, the LU control valve 28 is employed for outputting the control pressure to the controlled object associated with each shift stage at a higher speed. The controlled object of the LU control valve 28 is the lock-up clutch LU. The fourth shift valve 34 is employed for switching a selected shift stage between any one of the shift stages at the lower speed and any one of the shift stages at the higher speed.

Each of the first, second, third and fourth shift valve 31, 32, 33, 34 introduces the line pressure PL or the control pressure outputted from each control valve 25, 26, 27, 28. The shift valves 31, 32, 33, 34 switch the supply of the line pressure PL or the supply of the control pressure supplied to the friction engaging elements C1, C2, C3, B1, B2 in response to the operating condition of the shift valves 31, 32, 33, 34 corresponding to the oil pressure supplied thereto.

The ON-OFF solenoid valves 35, 36 respectively switch the supply of the oil pressure supplied to the first and second shift valves 31, 32 in response to the electric current applied to the ON-OFF solenoid valves 35, 36 and respectively switch the operating conditions of the first and second shift valves 31, 32. The ON-OFF solenoid valve 37 switches the supply of the oil pressure supplied to the third and fourth shift valves 33, 34 in response to the electric current applied to the ON-OFF solenoid valve 37 and further respectively switches the operating conditions of the third and fourth shift valves 33, 34.

The first and third linear solenoid valves 22, 24 generate no modulated pressure mod when no electric current is applied thereto and increase the generated modulated pressure mod in response to an increase of the electric current applied to the first and third linear solenoid valves 22, 24. The modulated pressure mod is outputted to the first control valve 25 from the first linear solenoid valve 22 and is outputted to either the start control valve 27 or the LU control valve 28 from the third linear solenoid valve 24. When the electric current is not applied to the first and third linear solenoid valves 22, 24, the modulated pressure is not supplied to the control valve 25 from the first linear solenoid valve 22 and is not supplied to the control valves 27 28 from the third linear solenoid valve 24.

The second linear solenoid valve 23 generates the modulated pressure mod to be a maximum pressure level when no electric current is applied to the second linear solenoid valve 23 and decreases the generated modulated pressure mod in response to an increase of the electric current applied to the second linear solenoid valve 23. The modulated pressure mod is outputted to the corresponding control valve 26 from the second linear solenoid valve 23. When the electric current at the maximum electric current level is applied to the second linear solenoid valve 23, the modulated pressure is not supplied to the control valve 26 from the second linear solenoid valve 23.

The first control valve 25 and either of the control valves 27, 28 generate no control pressure with no electric current being applied to the first and third linear solenoid valves 22, 24. The control pressure is increasingly generated by the control valve 25 and either of the control valves 27, 28 in response to an increase of the electric current being applied to the first and third linear solenoid valves 22, 24.

The control valve 26 generates the control pressure to be the maximum pressure level when no electric current is applied to the second linear solenoid valve 23. The control pressure is decreasingly generated by the control valve 26 in response to an increase of the electric current applied to the second linear solenoid valve 23. Therefore, the control valves 25, 26, 27, 28 generate substantially no control pressure when no electric current is applied to the first and third linear solenoid valves 22, 24 and when electric current at the maximum level is applied to the second linear solenoid valve 23.

The ON-OFF solenoid valves 35, 36 are normally closed type valves which respectively supply oil pressure to the first and second shift valves 31, 32 when electric current is applied to the valves 35, 36, and supply no oil pressure to the first and second shift valves 31, 32 when no electric current is applied to the valves 35, 36. The ON-OFF solenoid valve 37 is a normally closed type valve which supplies oil pressure to the third and fourth shift valves 33, 34 when electric current is applied to the valve 37 and supplies no oil pressure to the third and fourth shift valves 33, 34 when no electric current is applied thereto.

Each of the first and second shift valve 31, 32 is maintained under a first operating condition when the oil pressure is supplied to the first and second shift valve 31, 32 from the ON-OFF solenoid valves 35, 36 respectively. In this case, a valve element of each shift valve 31, 32 is biased downward in FIGS. 4 and 5. On the other hand, each of the first and second shift valve 31, 32 is maintained under a second operating condition when the supply of oil pressure from the valves 35, 36 is interrupted respectively. In this case, the valve element of each shift valve 31, 32 is returned to an upper position in FIGS. 4 and 5.

Each of the third and fourth shift valve 33, 34 is respectively maintained under a first operating condition when the oil pressure is supplied to the third and fourth shift valve 33, 34 from the ON-OFF solenoid valve 37. In this case, a valve element of each shift valve 33, 34 is biased downward in FIGS. 4 and 5. On the other hand, each third and fourth shift valve 33, 34 is maintained under a second operating condition when the supply of oil pressure from the valve 37 is interrupted respectively. In this case, the valve element of each shift valve 33, 34 is returned to an upper position in FIGS. 4 and 5.

Figure 6:
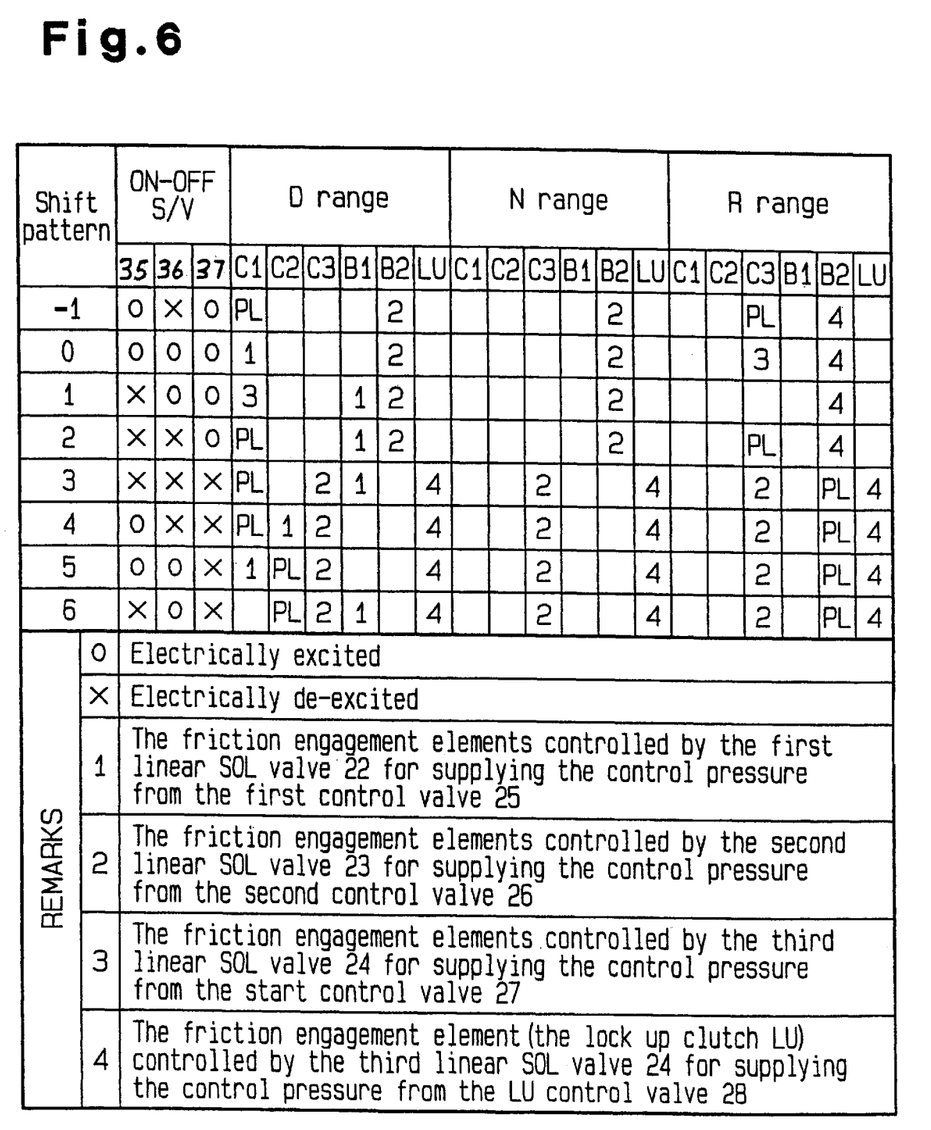
FIG. 6 is a table showing the relationships between the driving range and shift pattern set in response to controlling conditions of the hydraulic control unit under each driving range.

Referring to the table shown in FIG. 6, each shift pattern set in response to the controlling condition of the hydraulic control unit 3 is described. As illustrated in FIG. 6, the automatic transmission 1 according to the described and illustrated embodiment performs eight shift patterns from −1 to 6 for shifting the shift stage. More particularly, the eight shift patterns are performed through combinations of the ON-OFF solenoid valves 35, 36, 37 being respectively electrically excited (energized) or electrically de-excited (de-energized). Further, the eight shift patterns are divided into the shift patterns associated with the shift stages at the lower speed and the shift patterns associated with the shift stages at the higher speed in response to the ON-OFF solenoid valve 37 under either the electrically excited condition or the electrically de-excited condition. The hydraulic circuit of the hydraulic control unit 3 in FIG. 4 shows the shift pattern 1 representing the shift stages at the lower speed. The hydraulic circuit of the hydraulic control unit 3 in FIG. 5 shows the shift pattern 6 representing the shift stages at the higher speed.

FIG. 4 shows the hydraulic circuit of the hydraulic control unit 3 under the D range upon the shift pattern 1. In this case, the ON-OFF solenoid valve 35 is electrically de-excited and the first shift valve 31 is maintained under the second operating condition. The ON-OFF solenoid valves 36, 37 are electrically excited and the second, third, and fourth shift valves 32, 33, 34 are maintained under the first operating condition. The first and second control valves 25, 26 are supplied with the line pressure PL. The control pressure from the second control valve 26 is supplied to the second friction brake B2 via the third shift valve 33 and the control pressure from the first control valve 25 is supplied to the first friction brake B1 via the first shift valve 31. The start control valve 27 is supplied with the line pressure PL via the manual valve 21 and the first shift valve 31. The modulated pressure mod from the third linear solenoid valve 24 is introduced to the start control valve 27 via the fourth shift valve 34. The control pressure from the start control valve 27 is supplied to the first friction clutch C1 via the fourth shift valve 34, and the first and second shift valves 31, 32. Therefore, the first friction clutch C1 is engaged when the control pressure supplied to the first friction clutch C1 from the start control valve 27 is increased from a low pressure level up to a high pressure level in a state where the control pressure from the second control valve 26 supplied to the second friction brake B2 has been maintained under a high pressure level. In this case, the shift stage upon the shift pattern 1 is shifted from the neutral shift stage to the first shift stage.

FIG. 5 shows the hydraulic circuit of the hydraulic control unit 3 under the D-range upon the shift pattern 6. In this case, the ON-OFF solenoid valve 37 is electrically de-excited and the shift valves 33, 34 are maintained under the second operating condition. The line pressure PL is supplied to the second friction clutch C2 via the manual valve 21, the first, second third shift valves 31, 32, 33. The control pressure from the second control valve 26 is supplied to the third friction clutch C3 via the third shift valve 33. The first control valve 25 becomes operatively connected to the first friction brake B1 via the first shift valve 31. Therefore, the control pressure from the first control valve 25 is supplied to the first friction brake B1 via the first shift valve 31. The line pressure PL can be supplied to the LU control valve 28. The modulated pressure mod from the third linear solenoid valve 24 is introduced to the LU control valve 28 via the fourth shift valve 34. The control pressure from the LU control valve 28 can be supplied to the lock-up clutch LU. Therefore, lock-up is performed when the control pressure from the LU control valve 28 to be supplied to the lock-up clutch LU is maintained at a high pressure level.

Referring to FIG. 1, the electronic control unit 4 is provided with a microcomputer and is connected to an engine rotational speed sensor 41, an input shaft rotational speed sensor 42, an output shaft rotational speed sensor 43, a throttle opening degree sensor 44, and a position detecting sensor 45. The engine rotational speed sensor 41 detects a rotational number of the output shaft of the engine 2. The input shaft rotational speed sensor 42 detects a rotational number of the input shaft 11 of the automatic transmission 1. The output shaft rotational speed sensor 43 detects the rotational number of the output shaft 12 of the automatic transmission 1. The rotational number of the output shaft 12 corresponds to the vehicle speed. The throttle opening degree sensor 44 detects a throttle opening degree θ of the engine 2. The throttle opening degree θ of the engine 2 corresponds to the engine load. The position detecting sensor 45 detects the position of the shift lever manually operated by the driver. The electronic control unit 4 controls the electric current being applied to the first, second and third linear solenoid valves 22, 23, 24 and the ON-OFF solenoid valves 35, 36, 37. Therefore, a predetermined shift pattern is selected and the automatic transmission 1 performs a required shift stage which can be selected based upon the selected shift pattern.

The hydraulic control apparatus for the automatic transmission according to the described and illustrated embodiment is advantageous in several respects. The modulated pressure mod from the third linear solenoid valve 24 is selectively introduced to either the start control valve 27 or the LU control valve 28 via the fourth shift valve 34. The start control valve 27 outputs the control pressure to the first friction clutch C1 upon the shift pattern 1. The LU control valve 28 outputs the control pressure to the lock up clutch LU upon the shift pattern 6. As described above, the modulated pressure mod can be introduced to either the start control valve 27 or the LU control valve 28 so as to supply the control pressure from each control valve 27, 28 to each corresponding controlled object. Therefore, the responsiveness of the controlled objects can be improved.

The third linear solenoid valve 24 is positioned at a downstream side of the fourth shift valve 34 with respect to draining the modulated pressure mod introduced to either the start control valve 27 or the LU control valve 28. Air may be mixed with fluid at an upstream side of the third linear solenoid valve 24. However, air can be discharged from the third linear solenoid valve 24 to prevent slow response of the controlled objects and/or vibration from being generated to thus help ensure stable performance.

The control valve 27 outputs the control pressure to the first friction clutch C1 at any one of the shift stages at the lower speed(s). The control valve 28 outputs the control pressure to the lock-up clutch LU at any one of the shift stages at the higher speed(s). The fourth shift valve 34 is operated for switching the shift stage at the lower speed and the shift stage at the higher speed. Therefore, the two control valves 27, 28 and the fourth shift valve 34 are effectively operated relative to one another to perform an appropriate shifting control.

It is to be understood that the invention is not limited to the above described embodiment, and that modifications such as the following can be employed. In the above-described embodiment, the ON-OFF solenoid valves 35, 36, 37 are normally closed type valves. However, the valves 35, 36, 37 can be normally open type valves.

In addition, although the described and illustrated embodiment of the automatic transmission 1 performs six forward shift stages, the automatic transmission 1 can be structured to perform other shift stages.

Figure 7:
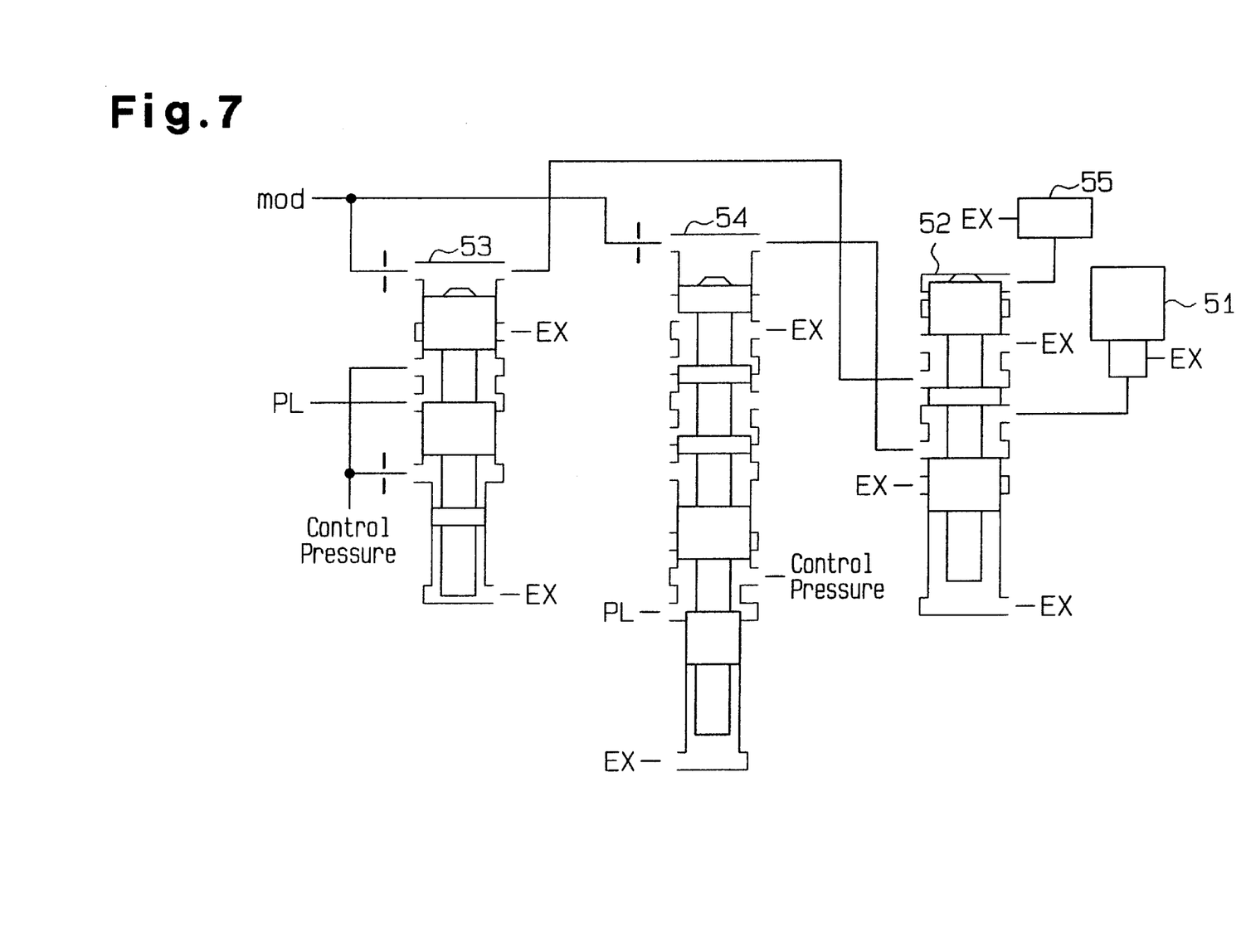
FIG. 7 is a schematic illustration of the hydraulic circuit of the hydraulic control unit of the automatic transmission according to a modified arrangement.

Also, although the automatic transmission 1 is applied to the hydraulic control unit 3, the automatic transmission 1 can be applied to other common hydraulic control apparatus. For example, as illustrated in FIG. 7, a linear solenoid valve 51 is arranged at the most downstream side (i.e, the right side in FIG. 7). The modulated pressure mod is selectively outputted from the linear solenoid valve 51 to either a first control valve 53 or a second control valve 54 via a shift valve 52. The supply of hydraulic pressure to be supplied to the shift valve 52 is switched in response to electric current being applied to the ON-OFF solenoid valve 55 to switch the supply of the modulated pressure mod to either the first control valve 53 or the second control valve 54. The line pressure PL has been introduced to the fist and second control valves 53, 54. Therefore, the control pressure is outputted from either the control valve 53 or 54 to corresponding controlled objects in response to the modulated pressure mod. The hydraulic control apparatus with this structure can obtain advantageous effects similar to those described above with respect to improved responsiveness of the controlled objects and preventing slow response of the controlled objects and/or vibration from being generated to thus help ensure stable performance.

Figure 8:
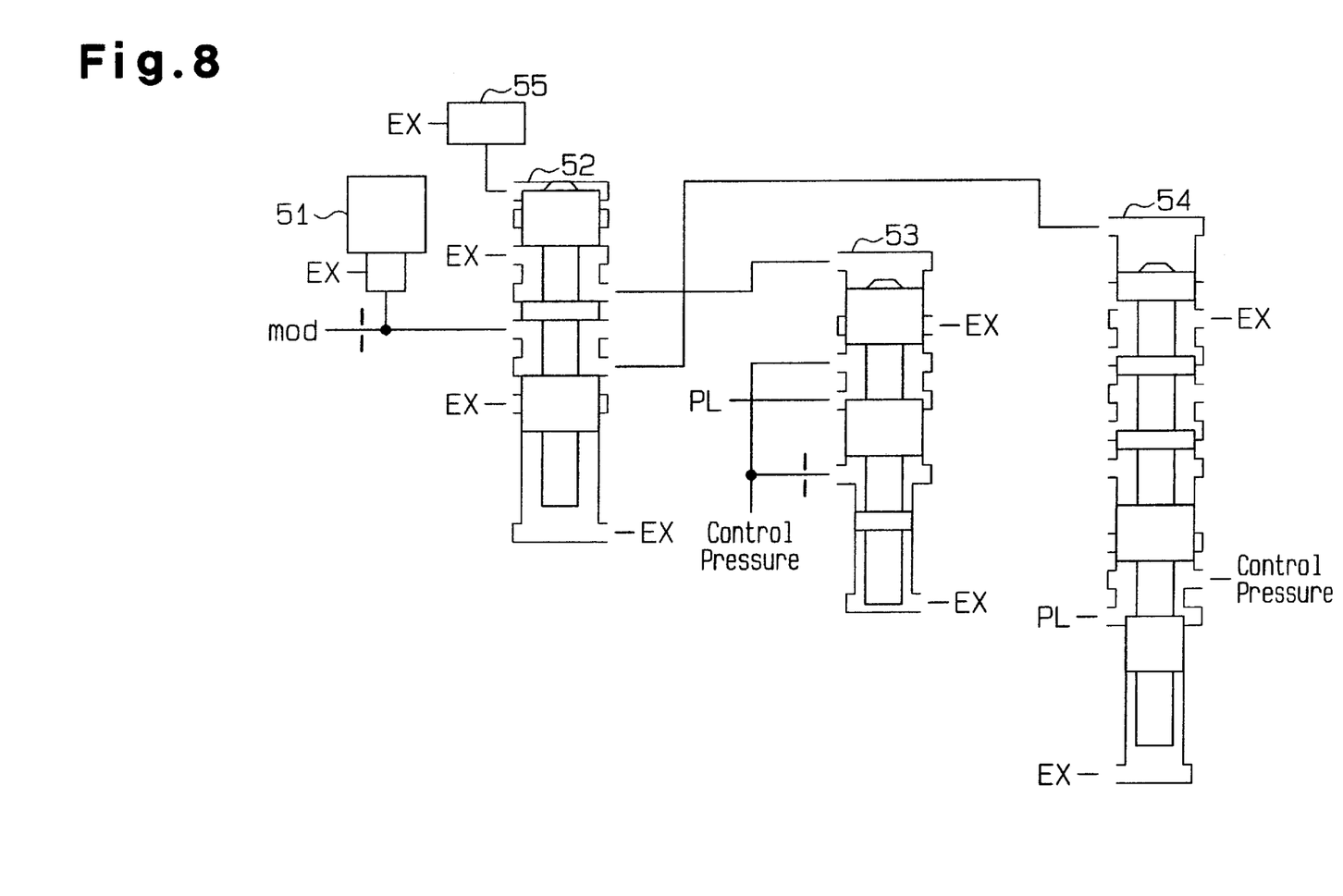
FIG. 8 is a schematic illustration of the hydraulic circuit of the hydraulic control unit of the automatic transmission according to a modified arrangement.

Further, as illustrated in FIG. 8, the linear solenoid valve 51 can be arranged at an upstream side of the shift valve 52 (i.e., the left side in FIG. 8). The hydraulic control apparatus with this structure provides improved responsiveness of the controlled objects. Either of the control valves 53, 54 which is not selected via the shift valve 52 is structured to release air outwardly. However, the control valves 53, 54 can be structured to be introduced with hydraulic pressure of the linear solenoid valve.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic control apparatus comprising:
    a linear solenoid valve for outputting modulated pressure in response to electric current applied to the linear solenoid valve;
    plural control valves outputting control pressure in response to the modulated pressure introduced from the linear solenoid valve;
    a shift valve for switching the control valves to which is to be introduced the modulated pressure in response to hydraulic pressure supplied to the shift valve; and
    an ON-OFF solenoid valve switching supply of the hydraulic pressure to the shift valve in response to electric current applied to the ON-OFF solenoid valve.

2. The hydraulic control apparatus according to claim 1, wherein the linear solenoid valve is arranged at a downstream side of the shift valve.

3. An automatic transmission control system comprising:
    a linear solenoid valve for outputting modulated pressure in response to electric current applied to the linear solenoid valve;
    plural control valves outputting control pressure in response to the modulated pressure introduced from the linear solenoid valve;
    plural friction engaging elements to be engaged and disengaged in different combinations based on the control pressure to change a shift stage;
    a shift valve for switching the control valves to which is to be introduced the modulated pressure in response to hydraulic pressure supplied to the shift valve to switch the friction engaging elements to which the control pressure is supplied; and
    an ON-OFF solenoid valve switching supply of the hydraulic pressure to the shift valve in response to electric current applied to the ON-OFF solenoid valve.

4. The automatic transmission control system according to claim 3, wherein the plural control valves includes a pair of control valves outputting the control pressure to each friction engaging element associated with any one of the shift stages at a higher speed and to each friction engaging elements associated with any one of the shift stages at a lower speed, and the shift valve which switches the friction engaging elements to which is supplied the control pressure being switched over upon shifting of the shift stage between the higher speed stage and the lower speed stage.

5. The automatic transmission control system according to claim 4, further comprising:
    a control unit which controls the electric current applied to the linear solenoid valve to control the control pressure outputted from the control valves and which controls the electric current applied to the ON-OFF solenoid valve to switch the friction engaging elements to which is to be introduced the control pressure via the shift valve.

6. An automatic transmission control system comprising:
    a linear solenoid valve for outputting modulated pressure in response to electric current applied to the linear solenoid valve;

a start control valve and a lock-up control valve which output control pressure in response to the modulated pressure introduced from the linear solenoid valve;

plural friction engaging elements to be engaged and disengaged in different combinations based on the control pressure to change a shift stage;

a shift valve operable in response to hydraulic pressure supplied to the shift valve for switching between introducing the modulated pressure to the start control valve and introducing the modulated pressure to the lock-up control valve to switch the friction engaging elements to which the control pressure is supplied; and an ON-OFF solenoid valve switching supply of the hydraulic pressure to the shift valve in response to electric current applied to the ON-OFF solenoid valve.

7. The automatic transmission control system according to claim 6, wherein the linear solenoid valve is arranged at a downstream side of the shift valve.

8. The automatic transmission control system according to claim 6, further comprising:
a control unit which controls the electric current applied to the linear solenoid valve to control the control pressure outputted from the start control valve and the lock-up control valve.

9. The automatic transmission control system according to claim 8, wherein the control unit controls the electric current applied to the ON-OFF solenoid valve to switch the friction engaging elements to which is to be introduced the control pressure via the shift valve.

* * * * *